UNITED STATES PATENT OFFICE.

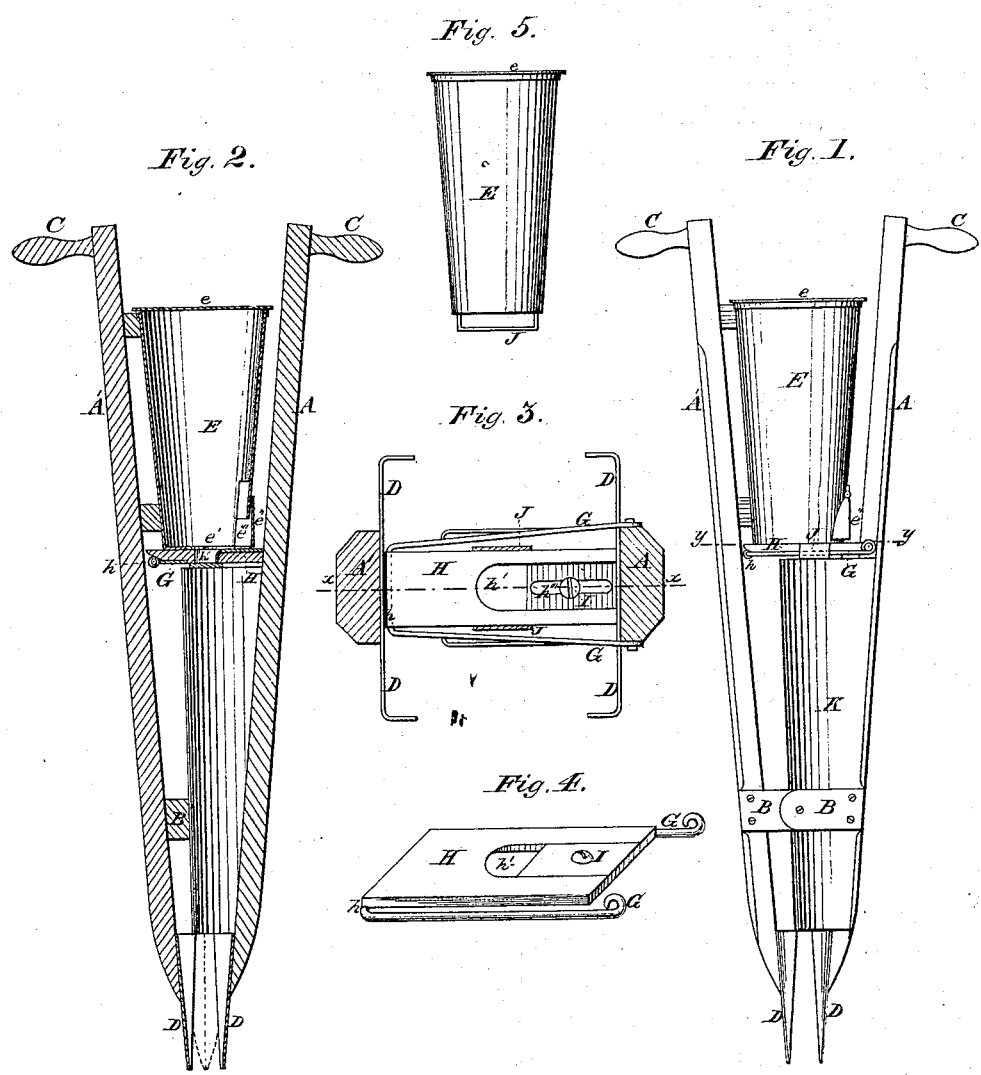

HERMANN KOELLER AND WILLIAM UECKE, OF CAMP POINT, ILLINOIS.

IMPROVEMENT IN CORN-PLANTERS.

Specification forming part of Letters Patent No. 129,144, dated July 16, 1872.

SPECIFICATION.

We, HERMANN KOELLER and WILLIAM UECKE, of Camp Point, county of Adams, and State of Illinois, have invented certain Improvements in Hand Corn-Planters, of which the following is a specification:

*Nature and Objects of the Invention.*

The nature of our invention relates to improvements in the construction and operation of hand corn-planters; and the invention consists in hinging or pivoting both ends of the seed-cup bar, and in so arranging it for opertion in connection with the seed-box or hopper that it will conform to and adjust itself to the bottom of the seed-box without strain or wear, all as hereinafter more fully set forth.

*Description of the Accompanying Drawing.*

Figure 1 is a side elevation of our invention. Fig. 2 is a vertical sectional view on the line $x\ x$ of Fig. 3. Fig. 3 is a horizontal sectional view on the line $y\ y$, Fig. 1. Fig. 4 is a perspective view of the seed-cup bar and the yoke in which it is pivoted. Fig. 5 is a separate view of the hopper and yoke.

*General Description.*

A A' are the side pieces, or two parts of the stock, to which the other parts of the machine are affixed. B B B B are plates, by which the two parts of the stock A A are pivoted to each other near their lower ends, as shown in the drawing. C C are handles, one on the upper end of each side piece A A'. D D are the dibbler-blades, one on the lower end of each side piece A A'. The sides of the blades D D are curved toward each other, as shown in the drawing, to give them strength, and to form a receptacle for the seed when they are brought together, as shown by dotted lines at Fig. 2. E is the seed-box or hopper, secured to one of the side pieces A', and provided with a cap or cover, $e$. $e'$ is a slot in the bottom of the hopper E. $e''$ is a guard or shield on the side of the hopper E where the outer end of slot $e'$ terminates. $e'''$ is a small brush or cut-off, attached to the inner side of seed-box E over slot $e'$, as shown. G is a stirrup, its ends attached to one of the side pieces A. H is the seed-slide, one end of which is pivoted to the stirrup G at the point $h$. $h'$ is a slot in the seed-slide or seed-cup bar H, and is the chamber in which the charges of seed are measured. $h''$ is a gauge, with a slot, $h'''$, longitudinally through which a screw, I, passes, by means of which it may be adjusted to enlarge or contract the seed-chamber $h'$. J is a yoke, its ends attached to the bottom of the hopper E, and its central portion passing around and fitting snugly to the seed-cup bar H. K is a duct, attached to one of the side pieces A.

The operation of our invention is as follows: The hopper E being supplied with the seed to be planted, and the different parts of the machine occupying the relative positions shown in Figs. 1 and 2 by full lines, the seed-chamber $h'$ will fill with seed, which will be held from dropping therefrom by the retainer or yoke J. Now, by drawing the upper ends of the side pieces A A' apart by means of the handles C C, the retainer J will pass from beneath the chamber $h'$, and allow the seed therein to drop through the duct K to the dibbler-blades D D, which, by separating the upper ends of side pieces A A', have been brought together to receive and retain the seed, as shown by dotted lines at Fig. 2. The lower and sharp ends of the blades D may now be inserted into the soil the depth at which it is desired to plant the seed, and while in that position the upper ends of the side pieces A A' are drawn together, separating the blades D D and depositing the seed contained between them, at the same time bringing the seed-chamber $h'$ underneath the slot $e'$ for another charge of seed, in which position the blades D D are withdrawn from the soil, when the upper ends of side pieces A A' may be again thrown apart and the operation repeated.

It will be seen at Fig. 2 that the oscillating motion of the seed-slide H allows it a free reciprocating movement through the yoke J. The guard or shield $e''$ will hold the charge of seed in the seed-chamber $h'$ from being thrown out while the upper ends of side pieces A A' are apart.

Claim.

The seed-cup bar H, constructed as described, and hinged or pivoted beneath the hopper E by stirrup G, in the manner and for the purpose set forth.

HERMANN KOELLER.
WILLIAM UECKE.

Witnesses:
W. A. BOOTH,
THOS. BAILEY.